(12) United States Patent
Zheng et al.

(10) Patent No.: US 11,846,595 B2
(45) Date of Patent: Dec. 19, 2023

(54) DIFFRACTION DEVICE AND METHOD FOR NON-DESTRUCTIVE TESTING OF INTERNAL CRYSTAL ORIENTATION UNIFORMITY OF WORKPIECE

(71) Applicant: THE 59TH INSTITUTE OF CHINA ORDNANCE INDUSTRY, China (CN)

(72) Inventors: Lin Zheng, China (CN); Shitao Dou, China (CN); Changguang He, China (CN); Zhengkun Peng, China (CN); Yong Xiao, China (CN); Lunwu Zhang, China (CN); Jin Zhang, China (CN); Xianhe Feng, China (CN)

(73) Assignee: THE 59TH INSTITUTE OF CHINA ORDNANCE INDUSTRY, Chongqing (CN)

( * ) Notice: Subject to any disclaimer, the term of this patent is extended or adjusted under 35 U.S.C. 154(b) by 283 days.

(21) Appl. No.: 17/418,867

(22) PCT Filed: Dec. 6, 2019

(86) PCT No.: PCT/CN2019/123593
§ 371 (c)(1),
(2) Date: Jun. 28, 2021

(87) PCT Pub. No.: WO2020/134959
PCT Pub. Date: Jul. 2, 2020

(65) Prior Publication Data
US 2022/0074877 A1    Mar. 10, 2022

(30) Foreign Application Priority Data
Dec. 28, 2018 (CN) .......................... 201811621809.0

(51) Int. Cl.
*G01N 23/207* (2018.01)
*G01N 23/20* (2018.01)
(Continued)

(52) U.S. Cl.
CPC ....... *G01N 23/20025* (2013.01); *G01N 23/20* (2013.01); *G01N 23/207* (2013.01);
(Continued)

(58) Field of Classification Search
CPC ............. G01N 23/20; G01N 23/20008; G01N 23/20025; G01N 23/207; G01N 2223/056;
(Continued)

(56) References Cited

U.S. PATENT DOCUMENTS

| 7,330,530 B2 | 2/2008 | Chapman |
| 2006/0251215 A1 | 11/2006 | Cernik |

(Continued)

FOREIGN PATENT DOCUMENTS

| CN | 1162116 A | 10/1997 |
| CN | 1485611 A | 3/2004 |

(Continued)

OTHER PUBLICATIONS

European Search Report dated Aug. 3, 2022 for EP19901751.8.
(Continued)

*Primary Examiner* — Mark R Gaworecki
(74) *Attorney, Agent, or Firm* — Apex Attorneys at Law, LLP; Yue (Robert) Xu (57) ABSTRACT

A diffraction apparatus and a method for non-destructively testing internal crystal orientation uniformity of a workpiece are provided. The apparatus includes: an X-ray irradiation system for irradiating an X-ray to a measured part of a sample under testing, and an X-ray detection system for simultaneously detecting a plurality of diffracted X-rays formed by diffraction of a plurality of parts of the sample under testing, to measure an X-ray diffraction intensity distribution of the sample under testing, where the detected diffracted X-rays are short-wavelength characteristic X-rays,
(Continued)

and the X-ray detection system is an array detection system. By the apparatus and the method, the detection efficiency is greatly improved.

18 Claims, 9 Drawing Sheets

(51) Int. Cl.
 *G01N 23/20025* (2018.01)
 *G01N 23/20008* (2018.01)
(52) U.S. Cl.
 CPC . *G01N 23/20008* (2013.01); *G01N 2223/056* (2013.01); *G01N 2223/302* (2013.01); *G01N 2223/602* (2013.01); *G01N 2223/605* (2013.01)
(58) Field of Classification Search
 CPC ....... G01N 2223/302; G01N 2223/602; G01N 2223/605
 See application file for complete search history.

(56) References Cited

U.S. PATENT DOCUMENTS

| | | |
|---|---|---|
| 2007/0041492 A1 | 2/2007 | Sakurai et al. |
| 2008/0031415 A1 | 2/2008 | Harding |
| 2008/0095311 A1 | 4/2008 | Zheng et al. |
| 2010/0111255 A1 | 5/2010 | Harding |
| 2016/0314862 A1 | 10/2016 | Kim et al. |
| 2018/0202948 A1 | 7/2018 | Sato et al. |

FOREIGN PATENT DOCUMENTS

| | | | |
|---|---|---|---|
| CN | 1588019 | A | 3/2005 |
| CN | 101358938 | A * | 2/2009 |
| CN | 101358938 | A | 2/2009 |
| CN | 101592623 | A | 12/2009 |
| CN | 102914555 | A | 2/2013 |
| CN | 104502385 | A | 4/2015 |
| CN | 106124396 | A | 11/2016 |
| EP | 1672361 | A1 | 6/2006 |
| JP | H02107952 | A | 4/1990 |
| JP | 2005083999 | A | 3/2005 |
| JP | 2006526138 | A | 11/2006 |
| JP | 2015225053 | A | 12/2015 |
| JP | 2018115964 | A | 7/2018 |
| WO | 2013108876 | A1 | 7/2013 |

OTHER PUBLICATIONS

The Japanese 1st Office Action dated Jun. 28, 2022 for JP2021-538426.

Ma Ce et al: "A new nondestructive instrument for bulk residual stress measurement using tungsten k[alpha]1 X-ray",Review of Scientific Instruments, American Institute of Physics, 2 Huntington Quadrangle, Melville, NY 11747,vol. 87, No. 11, Nov. 1, 2016 (Nov. 1, 2016), XP012213293, ISSN: 0034-6748, DOI: 10.1063/1.4965972,[retrieved on Nov. 1, 2016].

Harding et al: "X-ray diffraction imaging-A multi-generational perspective", Applied Radiation and Isotopes, Elsevier, Oxford, GB,vol. 67, No. 2, Feb. 1, 2009 (Feb. 1, 2009), pp. 287-295, XP025846513, ISSN: 0969-8043, DOI: 10.1016/J.APRADISO.2008.08.006,[retrieved on Aug. 12, 2008].

International Search Report for PCT/CN2019/123593 dated Mar. 6, 2020, ISA/CN.

Zheng Lin et al., Internal Residual Stress and Texture Homogenization in Pre-stretch Aluminum Alloy Plates, Journal of Netshape for Ming Engineering, Sep. 2014, vol. 6.

\* cited by examiner

DIFFRACTION DEVICE AND METHOD FOR NON-DESTRUCTIVE TESTING OF INTERNAL CRYSTAL ORIENTATION UNIFORMITY OF WORKPIECE

The present application is the U.S. national phase of International application No. PCT/CN2019/123593, titled "DIFFRACTION DEVICE AND METHOD FOR NON-DESTRUCTIVE TESTING OF INTERNAL CRYSTAL ORIENTATION UNIFORMITY OF WORKPIECE", filed on Dec. 6, 2019, which claims the priority to Chinese Patent Application No. 201811621809.0, titled "DIFFRACTION DEVICE AND METHOD FOR NON-DESTRUCTIVE TESTING OF INTERNAL CRYSTAL ORIENTATION UNIFORMITY OF WORKPIECE", filed on Dec. 28, 2018, with the China National Intellectual Property Administration, both of which are incorporated herein by reference in their entirety.

FIELD

The present disclosure relates to the technical field of non-destructive testing, and in particular to a diffraction apparatus, and a method for non-destructively testing internal crystal orientation uniformity of a workpiece with the diffraction apparatus.

BACKGROUND

The article "Internal Residual Stress and Texture Homogenization in Pre-stretch Aluminum Alloy Plates" published by Zheng Lin et al. in the Journal of Netshape Forming Engineering introduces how to use an SWXRD-1000 short-wavelength X-ray diffractometer to non-destructively measure the WKα1 diffraction intensity distribution along the K angle by K angle scanning on parts at different layer depths of a pre-stretched aluminum plate with a thickness from 20 mm to 25 mm, to characterize the uniformity of the internal texture over the entire thickness of the pre-stretched aluminum plate. However, to use this short-wavelength X-ray diffractometer for testing, it is required that after the WKα1 diffraction intensities at 21 K angles at one layer depth is scanned and measured, another layer depth of the sample has to be moved to the center of a diffractometer circle, to scan and measure the WKα1 diffraction intensities at 21 K angles at this layer depth, until K angle scanning and measurement at 11 layer depths are completed. It takes about 0.5 minutes to measure the WKα1 diffraction intensity at each K angle at each layer depth. Thus, it takes about 21*11*0.5 minutes=115.5 minutes in total, which is too long. Apparently, the above method is neither suitable for the rapid characterization of the internal crystal orientation uniformity of centimeter-thick samples, nor is it suitable for online non-destructive testing of the internal crystal orientation uniformity and internal texture uniformity of commonly used materials on the production line. In addition, other existing devices or methods for testing the crystal orientation uniformity within centimeter-thick samples also have the problems of long testing time and low testing efficiency. Thus, to shorten the testing time to less than two minutes is a major technical difficulty in this field.

SUMMARY

One objective of the present disclosure is to provide a diffraction apparatus, and a second objective of the present disclosure is to provide a method for non-destructively testing internal crystal orientation uniformity of a workpiece with this diffraction apparatus, which can quickly test the crystal orientation uniformity within the workpiece.

The objectives of the present disclosure are achieved by the technical solutions described below.

A diffraction apparatus includes an X-ray irradiation system for irradiating an X-ray to a measured part of a sample under testing, and an X-ray detection system for simultaneously detecting multiple diffracted X-rays formed by diffraction of multiple parts of the sample under testing, to measure an X-ray diffraction intensity distribution of the sample under testing, where the detected diffracted X-rays are short-wavelength characteristic X-rays, and the X-ray detection system is an array detection system.

Further, the array detection system includes a receiving array collimator, and an array detector that matches the receiving array collimator and has detection units each enabled with single-photon measurement.

Further, each pixel of the array detector is enabled with single-photon measurement.

Further, the array detector is a CdTe array detector or a CdZnTe array detector.

Further, each pixel of the array detector is provided with a pulse height comparator.

Further, each pixel of the array detector is provided with at least two pulse height comparators.

Further, a size of each pixel of the array detector is 0.05 mm to 0.2 mm.

Further, a size of each of light-passing holes of the receiving array collimator is 0.05 mm to 0.2 mm, a distance between centers of adjacent light-passing holes is 0.02 mm to 0.2 mm, and the light-passing holes are parallel to each other and with the same size.

Further, a divergence of the receiving array collimator on a diffractometer circle plane of the diffraction apparatus is 0.02° to 0.2°.

Preferably, the receiving array collimator is made of a heavy metal material with an atomic number greater than 46.

More preferably, the receiving array collimator is made of gold, silver or tungsten.

Further, the X-ray irradiation system includes: a heavy metal anode target X-ray tube, an incident collimator, a sample platform on which the sample under testing is disposed, a main control computer, a high voltage generator, a controller, a remote operation terminal, an X-ray shielding cover, a θ rotation mechanism that drives the heavy metal anode target X-ray tube to rotate, a 2θ rotation mechanism that drives the array detection system to rotate, and a β rotation mechanism that drives the array detection system to rotate, where the heavy metal anode target X-ray tube, the incident collimator, and the array detection system are mounted on the frame, where a distance from the center of a diffractometer circle of the diffraction apparatus to a window of the heavy metal anode target X-ray tube is 75 mm to 300 mm, and a distance from the center of the diffractometer circle to the array detector is 100 mm to 300 mm;

an extended center line of a light-passing hole of the incident collimator and an extended center line of a detection unit in a middle section of the array detector intersect at the center of the diffractometer circle;

the heavy metal anode target X-ray tube, the high voltage generator and the controller form an X-ray source to emit X-rays, the heavy metal anode target X-ray tube includes a W target X-ray tube, an Au target X-ray tube, an Ag target X-ray tube, or a U target X-ray tube, and a voltage applied to the heavy metal anode target X-ray tube is not less than twice an excitation voltage for generating a short-wavelength characteristic X-ray;

short-wavelength characteristic X-rays diffracted by different parts are directly incident on corresponding detection units of the array detector through corresponding light-passing holes of the receiving array collimator;

the heavy metal anode target X-ray tube and the incident collimator are mounted on the θ rotation mechanism, the θ rotation mechanism is configured to drive the heavy metal anode target X-ray tube and the incident collimator to rotate around the center of the diffractometer circle, the array detection system is mounted on the 2θ rotation mechanism, the 2θ rotation mechanism is configured to drive the array detection system to rotate around the center of the diffractometer circle, the array detection system is also mounted on the β rotation mechanism by the 2θ rotation mechanism, the β rotation mechanism is configured to drive the array detection system to rotate around a vertical imaginary line passing the center of the diffractometer circle of the diffraction apparatus as an axis, θ=0° in a case that the heavy metal anode target X-ray tube and the incident collimator so rotate as to cause an incident beam to coincide with a β rotation axis, and 2θ=0° in a case that the array detection system so rotates as to cause orientations of the light-passing holes thereof to coincide with or be parallel to the β rotation axis;

a short-wavelength characteristic X-ray diffraction count intensity measured by each corresponding detection unit of the array detector enters a communication interface of the main control computer via a signal cable; and the controller is configured to start the high voltage generator, and adjust and control a voltage and a current outputted by the high voltage generator, the main control computer and the remote operation terminal on both sides of the X-ray shielding cover are connected by a signal cable, and the diffraction apparatus is operable and controllable by an operator with the main control computer on the remote operation terminal.

Further, a size of the light-passing hole of the incident collimator is 0.05 mm to 0.2 mm, and a divergence of the light-passing hole of the incident collimator on the diffractometer circle plane is 0.02° to 0.2°.

A method for non-destructively testing internal crystal orientation uniformity of a workpiece, with the diffraction apparatus, includes:

step 1: selecting a short-wavelength characteristic X-ray, and determining a wavelength $\lambda_0$ and a photon energy $E_0$, where the short-wavelength characteristic X-ray is $WK\alpha_1$, $AuK\alpha_1$, $Ag\alpha_1$, or $UK\alpha_1$;

step 2: performing a texture analysis on a matrix phase of a part of a sample under testing, selecting a strong diffraction crystal plane (hkl) of the matrix phase of the sample under testing as a diffraction crystal plane under testing, determining a corresponding diffraction angle $2\theta_{hkl}$, selecting a direction with a maximum of the diffraction intensity distribution of the diffraction crystal plane or a direction near the direction as a direction of a diffraction vector Q under testing, and determining azimuth angles $\alpha_0$ and $\beta_0$ of the direction of the diffraction vector Q under testing in a coordinate system of the sample under testing;

step 3: disposing a thickness center of the sample under testing near the center of the diffractometer circle of the diffraction apparatus;

step 4: arranging the array detection system at the diffraction angle $2\theta_{hkl}$ of the diffraction apparatus and in the direction of the diffraction vector Q ($\alpha_0$, $\beta_0$), so that the array detection system can simultaneously measure count intensities of short-wavelength characteristic X-rays diffracted by parts along a layer depth of the sample under testing, where the parts along the layer depth of the sample refer to corresponding parts where incident X-ray beams passing through the sample under testing along a path intersect with spatial extended lines of the light-passing holes of the receiving array collimator;

step 5: starting a test, measuring simultaneously count intensities of short-wavelength characteristic X-rays diffracted in the direction of $2\theta_{hkl}$ by the parts along a path in which incident X-ray beams pass through the sample under testing, in the direction of the diffraction vector Q ($\alpha_0$, $\beta_0$), in a case that the sample under testing is fixed relative to the diffraction apparatus, and measuring continuously, at a fixed time interval, count intensities of short-wavelength characteristic X-rays diffracted by corresponding parts in areas of the sample under testing scanned by an incident X-ray beam and a distribution of the count intensities, in a case that the sample under testing is moving relative to the diffraction apparatus;

step 6: correcting the count intensities of the short-wavelength characteristic X-rays obtained by the array detection system, and obtaining short-wavelength characteristic X-ray diffraction intensities of coordinate positions in measured parts of the sample under testing and a distribution of the short-wavelength characteristic X-ray diffraction intensities; and step 7: determining internal crystal orientation uniformity within the sample under testing according to a difference degree of the distribution of the short-wavelength characteristic X-ray diffraction intensities in a sample space.

In a preferred embodiment, each pixel of the array detector is enabled with single photon measurement; the array detector is a one-dimensional array detector, the detection unit of the array detector is a pixel corresponding to a light-passing hole of the receiving array collimator, that is, an X-ray count intensity detected by an $i^{th}$ detection unit is a short-wavelength characteristic X-ray count intensity $I_i$ detected by an $i^{th}$ pixel corresponding to a respective light-passing hole; alternatively, the array detector is a two-dimensional array detector, and an $i^{th}$ detection unit of the array detector is formed by a column of pixels corresponding to a light-passing hole of the receiving array collimator, that is, the short-wavelength characteristic X-ray count intensity detected by the $i^{th}$ detection unit is a sum of X-ray count intensities detected by the column of pixels corresponding to the light-passing hole.

In a preferred embodiment, each pixel of the array detector has an energy resolution of 2W and is provided with a pulse height comparator, an energy threshold $E_1=(1-W)E_0$ of a photon detected by each pixel is determined by presetting a pulse height of the pulse height comparator, so that the $i^{th}$ detection unit of the array detector only detects and records the number of photons with energy greater than or equal to the energy $E_1$, and the number of the photons with energy greater than or equal to the energy $E_1$ detected and recorded by the $i^{th}$ detection unit of the array detector is the short-wavelength characteristic X-ray count intensity $I_i$ detected by the $i^{th}$ detection unit of the array detector.

In a preferred embodiment, each pixel of the array detector has an energy resolution of 2W and is provided with at least two pulse height comparators, energy thresholds $E_1=(1-W)E_0$ and $E_2=(1+W)E_0$ of photons detected by each pixel are determined by presetting a pulse height, so that the $i^{th}$ detection unit of the array detector detects and records both the number $I1_i$ of photons with energy greater than or equal to the energy $E_1$ and the number $I2_i$ of photons with energy greater than or equal to the energy $E_2$, and a difference of the number $I1_i$ of the photons with energy greater than or equal to the energy $E_1$ minus the number $I2_i$ of the photons with energy greater than or equal to the energy $E_2$ is the short-wavelength characteristic X-ray count intensity $I_i$ detected by the $i^{th}$ detection unit of the array detector.

Beneficial effects of the present disclosure are as follows. The method and apparatus of the present disclosure can simultaneously scan and detect multiple parts at different layer depths, without the need to perform scanning and testing separately at each individual layer depth. Thus, detection efficiency is greatly improved and detection time is saved. With the present disclosure, the duration for testing the internal crystal orientation uniformity of the centimeter-thick workpiece over its entire thickness can be shortened to less than two minutes, thereby solving the technical problem of time-consuming testing of the internal crystal orientation uniformity of a centimeter-thick workpiece. By applying the present disclosure, not only can the internal crystal orientation uniformity of a centimeter-thick workpiece be detected quickly and non-destructively over its entire thickness, but also the internal crystal orientation uniformity of the centimeter-thick workpiece over an entire thickness along its motion trajectory can be detected and represented online on a production line. Compared with methods in the conventional art, the detection efficiency of the method can be increased by tens to hundreds times and the method is non-destructive, fast, simple, low-cost, practical and reliable. Taking testing of the internal crystal orientation uniformity of an aluminum plate with a thickness of 20 mm to 25 mm along the thickness direction for example, it takes around 115.5 minutes by the testing method in the background section, while it only 20 seconds by the method according to the present disclosure. By comparison, the detection efficiency is increased by about 346 times.

Reference numerals are listed as follows:
1, heavy metal anode target X-ray tube; 2, incident collimator; 3, sample platform; 4, sample; 5, array detector; 6, receiving array collimator; 7, main control computer; 8, high voltage generator; 9, controller; 10, remote operation terminal; 11, diffraction positions and diffraction volumes of various light-passing holes; 12, X-ray shielding cover; 13, θ rotation mechanism of the heavy metal anode target X-ray tube 1; 14, 2θ rotation mechanism of the array detection system; 15, β rotation mechanism of the array detection system; 16, frame; 22, pixel of the array detector; where the array detection system includes the receiving array collimator and an array detector.

DETAILED DESCRIPTION

Hereinafter the present disclosure is further described in conjunction with the embodiments. It is pointed out here that the following embodiments should not be construed as limiting the scope of protection of the present disclosure. Modifications and adjustments based on the embodiments of the present disclosure by those skilled in the art without changes in essence fall within the scope of protection of the present disclosure.

Embodiment 1

This embodiment focuses on the testing apparatus used in the method provided in the present disclosure, a diffraction apparatus.

Figure 1:
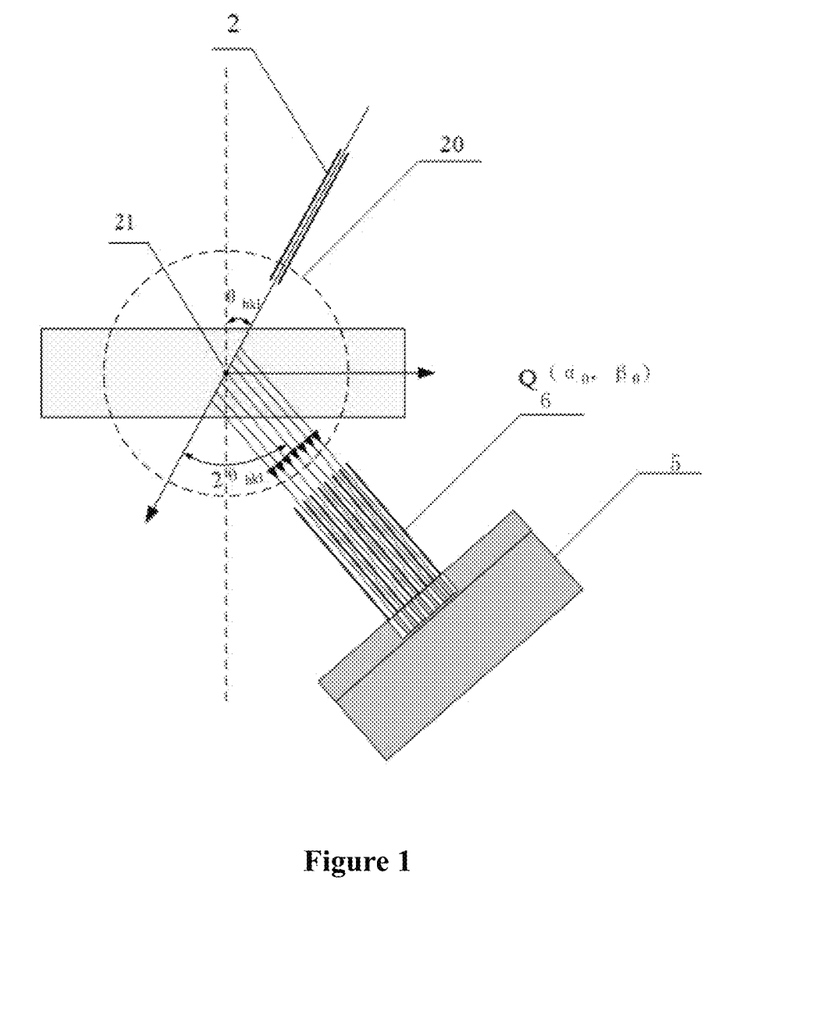
FIG. 1 is a schematic diagram of a method for non-destructively testing internal crystal orientation uniformity of a workpiece according to the present disclosure, where 20 represents a diffractometer circle of an apparatus, 21 represents the center of the diffractometer circle of the apparatus, 2 represents an incident collimator of the apparatus, 5 represents an array detector of the apparatus, 6 represents a receiving array collimator of the apparatus, and Q ($\alpha_0$, $\beta_0$) is a normal direction of a diffraction crystal plane (hkl) of parts on a path of an incident X-ray beam passing through a sample under testing.
Figure 3:
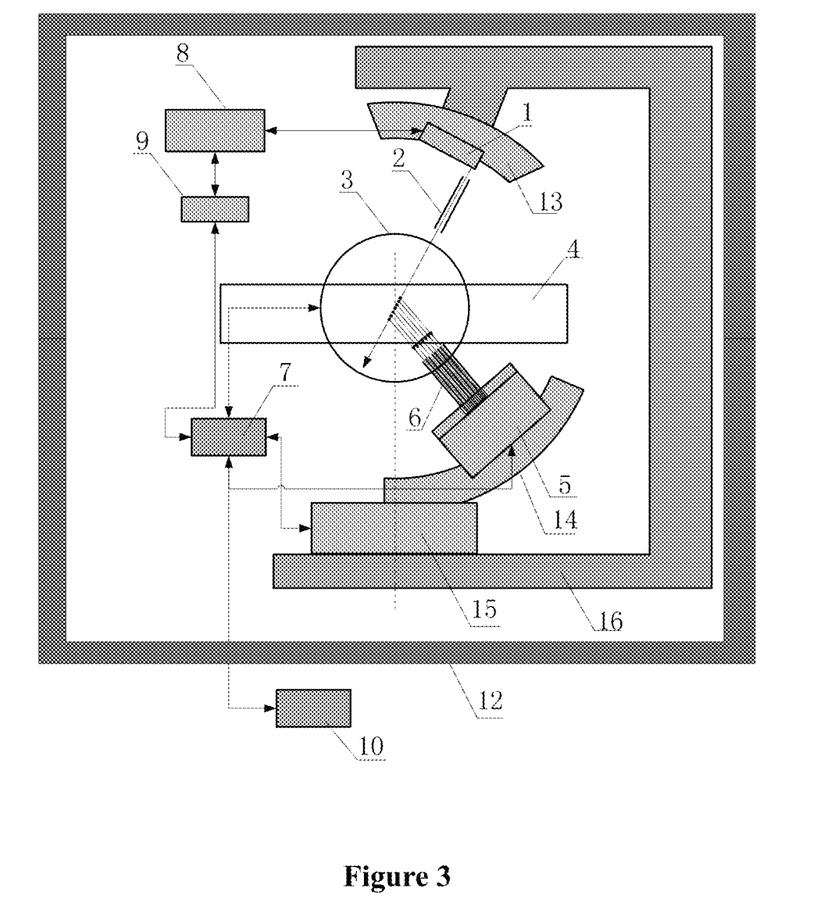
FIG. 3 is a schematic diagram of a diffraction apparatus according to the present disclosure.
Figure 6:
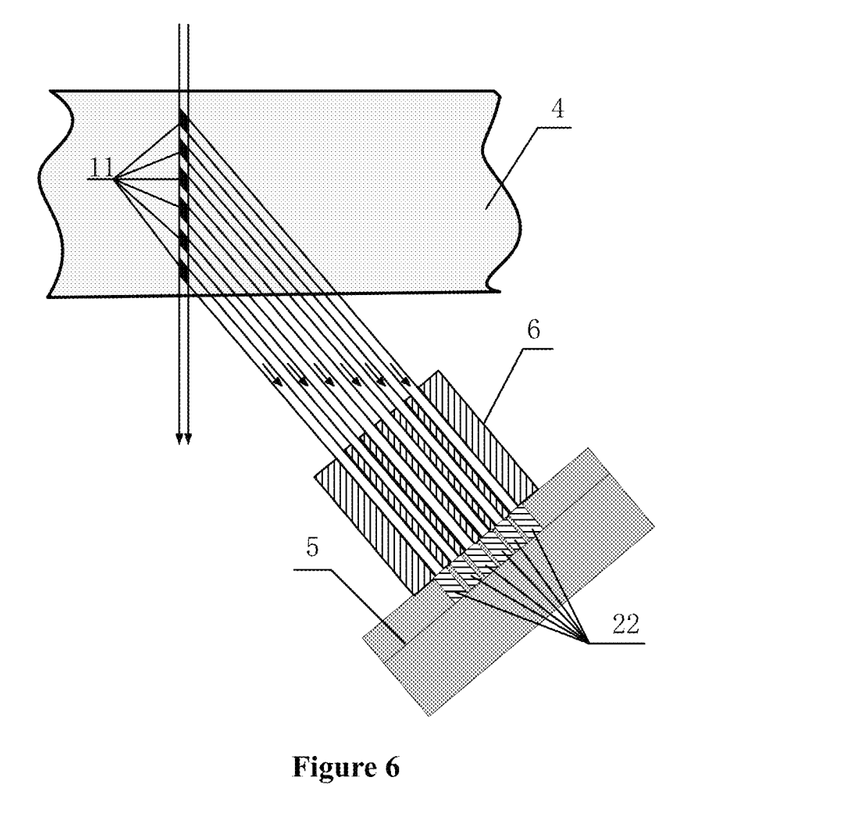
FIG. 6 is a schematic diagram of a receiving array collimator of a diffraction apparatus and an array detection system detecting diffraction rays formed by various parts, according to the present disclosure.

A diffraction apparatus is provided, as shown in FIG. 1, FIG. 3, and FIG. 6. The apparatus includes: a heavy metal anode target X-ray tube 1, an incident collimator 2, a sample platform 3 on which a sample 4 is disposed, an array detector 5 having detection units each enabled with single-photon measurement, a receiving array collimator 6 fixed in front of the array detector 5, a main control computer 7, a high voltage generator 8, a controller 9, a remote operation terminal 10, an X-ray shielding cover 12, a θ rotation mechanism 13 that drives the heavy metal anode target X-ray tube 1 to rotate, an array detection system composed of the receiving array collimator 6 and the array detector 5, a 2θ rotation mechanism 14 that drives the array detection system to rotate, a β rotation mechanism 15 that drives the array detection system to rotate, and a frame 16 of the apparatus.

A distance from the center of a diffractometer circle of the diffraction apparatus to a window of the heavy metal anode target X-ray tube is 75 mm to 300 mm, and a distance from the center of the diffractometer circle to the array detector is 100 mm to 300 mm.

An extended center line of the incident collimator 2 and an extended center line of a detection unit in a middle section of the array detector 5 intersect at the center of the diffractometer circle.

The heavy metal anode target X-ray tube 1, the high voltage generator 8 and the controller 9 form an X-ray source of the apparatus to emit X-rays, and a voltage applied to the heavy metal anode target X-ray tube is not less than twice an excitation voltage for generating a short-wavelength characteristic X-ray.

Figure 4:
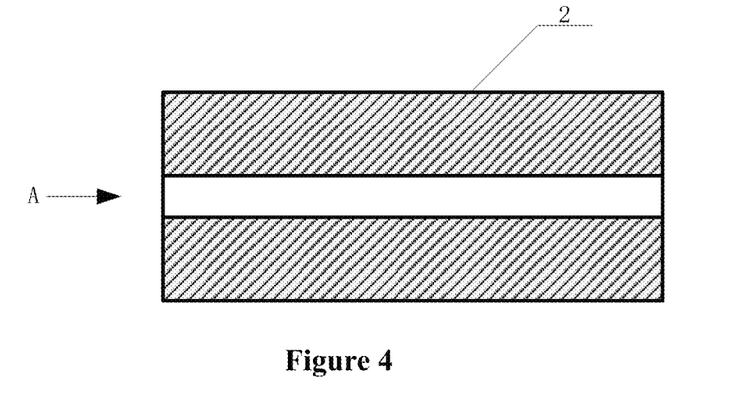
FIG. 4 is a sectional view of an incident collimator of a diffraction apparatus according to the present disclosure.
Figure 5:
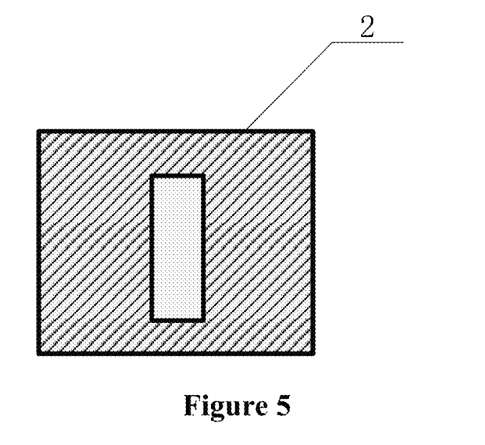
FIG. 5 is a A-direction view of the incident collimator as shown in FIG. 4, a light-passing hole of which is rectangular.

The incident collimator 2 is made of a heavy metal material that strongly absorbs X-rays and has an atomic number greater than 46, such as gold, silver, tungsten, etc. A light-passing hole of the incident collimator 2 is rectangular, circular or of other regular shapes, which has a divergence greater than 0.02° and less than 0.20° on a diffractometer circle plane. Each light-passing hole has the same size, which ranges from 0.05 mm to 0.2 mm. In a case that the light-passing hole is circular, the diameter of the circular hole is 0.05 mm to 0.2 mm; in a case that the light-passing hole is rectangular, the width of the rectangular hole is 0.05 mm to 0.2 mm; in a case that the light-passing hole is triangular, the width of the bottom side of the triangle is 0.05 mm to 0.2 mm.

Light-passing holes of the receiving array collimator 6 are parallel to each other, and are rectangular or circular holes of the same size, with the same divergence greater than 0.02° and less than 0.20° on the diffractometer circle plane. The distance between center lines of adjacent light holes is 0.02 mm to 0.2 mm. The receiving array collimator 6 is made of a heavy metal material that strongly absorbs X-rays, such as gold, silver, tungsten, etc.

The array detector 5 is a CdTe array detector.

Each of the light-passing holes of the receiving array collimator 6 faces a corresponding detection unit. The array detector 5 and the receiving array collimator 6 constitute the array detection system for detecting short-wavelength X-ray diffraction. The diffracted short-wavelength X-rays can be directly incident on corresponding detection units of the array detector 5 through respective light-passing holes of the receiving array collimator 6.

The heavy metal anode target X-ray tube 1 and the incident collimator 2 are mounted on the θ rotation mechanism 13, and the θ rotation mechanism 13 may drive the heavy metal anode target X-ray tube 1 and the incident collimator 2 to rotate around the center of the diffractometer circle. The array detection system is mounted on the 2θ rotation mechanism 14, and the 2θ rotation mechanism 14 may drive the array detection system to rotate around the center of the diffractometer circle. The array detection system is mounted on the β rotation mechanism 15 by the 2θ rotation mechanism 14, and the β rotation mechanism 15 may drive the array detection system to rotate around a vertical imaginary line passing the center of the diffractometer circle in FIG. 3 as an axis. In a case that the heavy metal anode target X-ray tube 1 and incident collimator 2 so rotate as to cause an incident beam to coincide with the β rotation axis, θ=0'; in a case that the array detection system so rotates as to cause orientations of the light-passing holes thereof to coincide with or be parallel to the β rotation axis, 2θ=0°.

The β rotation mechanism 15 may drive the array detection system to rotate around a vertical imaginary line passing the center of the diffractometer circle as shown in a schematic diagram of the diffraction apparatus (FIG. 3). In a case that the heavy metal anode target X-ray tube 1 and incident collimator 2 so rotate as to cause an incident beam to coincide with the β rotation axis, θ=0'; in a case that the array detection system so rotates as to cause orientations of the light-passing holes thereof to coincide with or be parallel to the β rotation axis, 2θ=0°. Through the rotation of the θ rotation mechanism 13 and the rotation of the 2θ rotation mechanism 14, a direction angle α of the diffraction vector Q under testing may be turned to $\alpha=\alpha_0$; through the rotation of the β rotation mechanism 15, a direction angle β of the diffraction vector Q under testing can be turned to $\beta=\beta_0$. Thus, it is ensured that with the diffraction geometry satisfied, count intensities of short-wavelength characteristic X-rays diffracted by parts along a path in which the incident beam passes through a sample under testing are measured both in the direction of the diffraction vector Q ($\alpha_0$, $\beta_0$) under testing determined by the method according to the present disclosure in the sample coordinate and in the direction of $2\theta=2\theta_{hkl}$, so as to characterize internal crystal orientation uniformity of the sample under testing over the entire thickness thereof.

A short-wavelength characteristic X-ray diffraction count intensity measured by each corresponding detection unit of the array detector 5 enters a communication interface of the main control computer 7 via a signal cable. The short-wavelength X-ray diffraction count intensity distribution of sample 4 along the depth is measured, which characterizes the uniformity of the crystal orientation of a material/workpiece under testing along the depth. In a case that the sample is moving relative to the diffraction apparatus, the measured short-wavelength X-ray diffraction count intensity distribution not only characterizes the uniformity of internal crystal orientation along the depth inside the material/workpiece under testing, but also characterizes the internal crystal orientation uniformity of the material/workpiece under testing along the motion trajectory of the sample 4.

The high voltage controller 9 is configured to turn on the high voltage generator 8, and adjust and control s voltage and a current outputted by the high voltage generator 8. The main control computer 7 and the remote operation terminal 10 on both sides of the X-ray shielding cover 12 are connected by a signal cable, and an operator can operate and control the diffraction apparatus by the main control computer 7 on the remote operation terminal 10. The heavy metal anode target X-ray tube 1, the X-ray source, the incident collimator, and the array detection system are mounted on the frame 16 of the apparatus.

Embodiment 2

Figure 7:
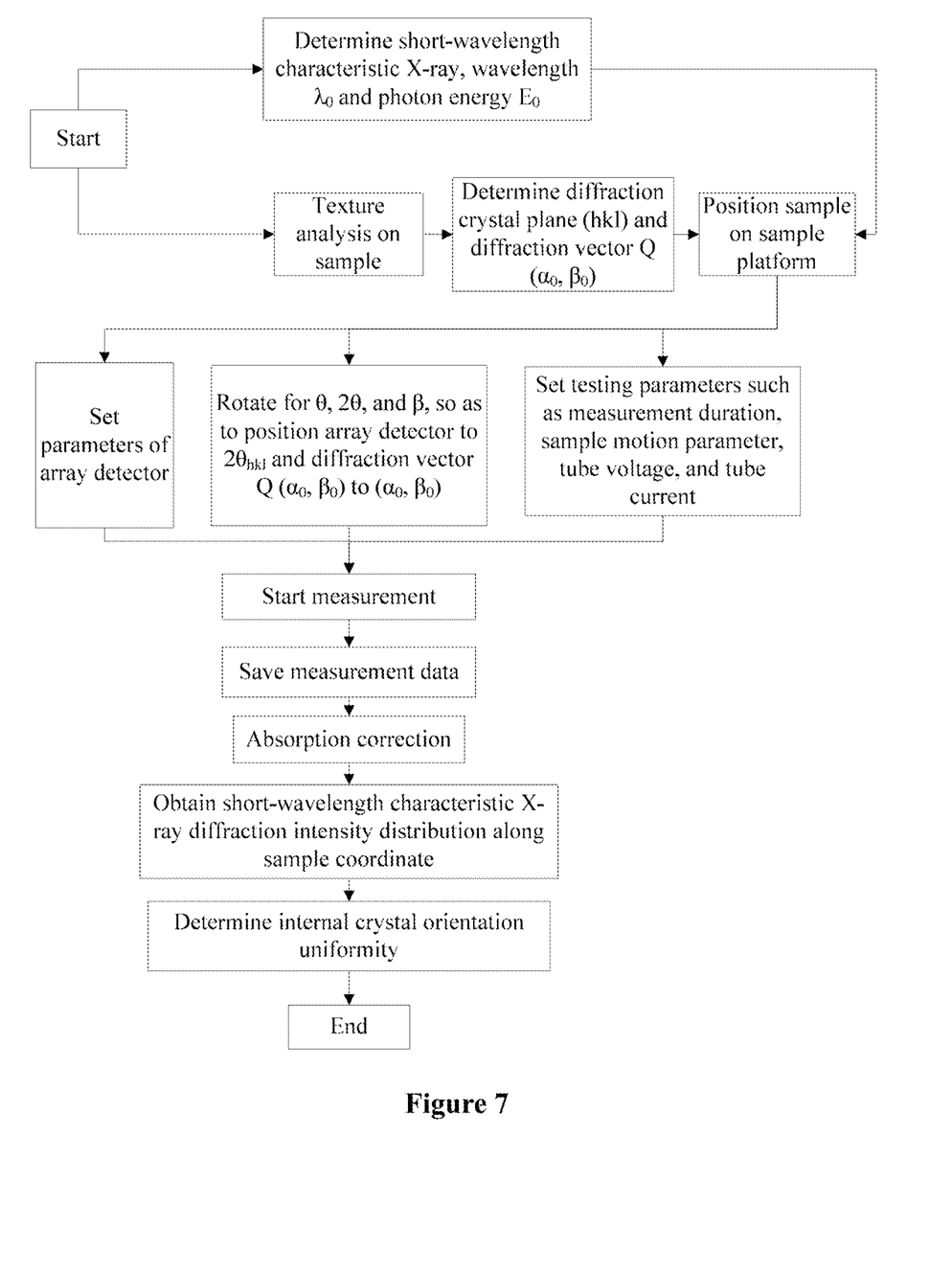
FIG. 7 is a flow chart of a method for non-destructively testing internal crystal orientation uniformity of a workpiece according to the present disclosure.

A method for non-destructively testing internal crystal orientation uniformity of a workpiece is provided, which uses the diffraction apparatus in embodiment 1 to detect the crystal orientation uniformity in a cold-rolled 25 mm thick 2024 aluminum plate. As shown in FIG. 7, the method includes the following steps 1 to 7.

In step 1, a short-wavelength characteristic X-ray is selected, a wavelength $\lambda_0$=0.0209 nm and a photon energy $E_0$=59.3 kev are determined.

Figure 2:
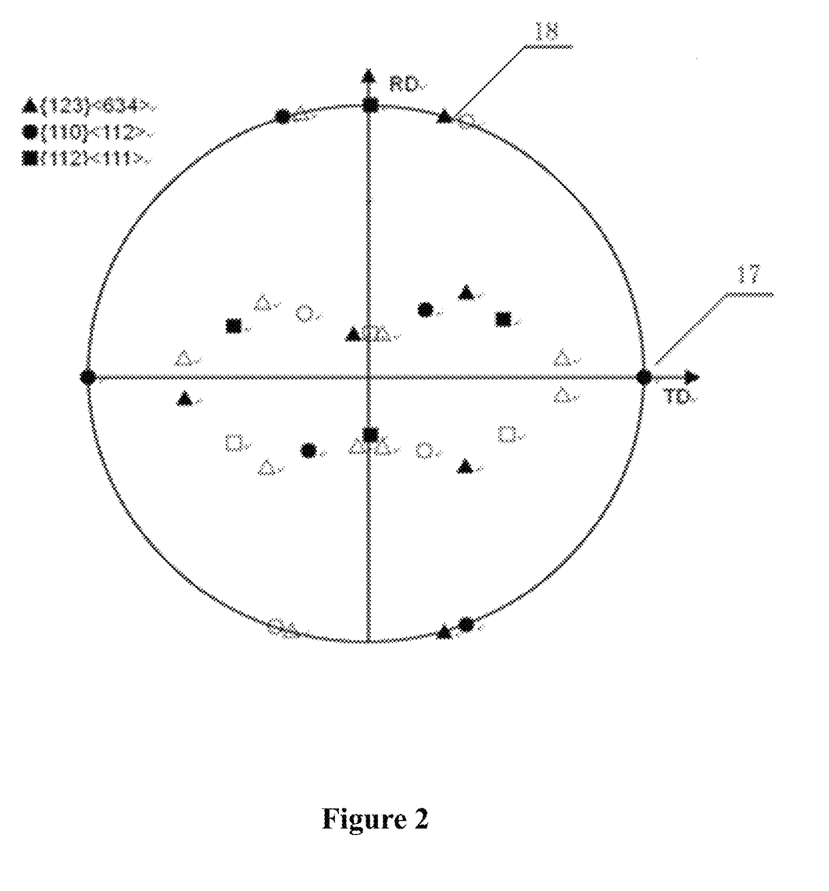
FIG. 2 is an Al{111} pole figure of a rolled aluminum plate identifying two diffraction vectors under testing of a workpiece under testing.

In step 2, the crystal orientation distribution of the 2024 aluminum plate is detected and analyzed by XRD (X-ray diffraction). The measured Al{111} pole figure of an intermediate layer and its analysis result are shown in FIG. 2. The direction at the point 17 (the intersection point of the outer circle of the pole figure and the transverse direction TD) on the pole figure shown in FIG. 2 is selected as the direction of the diffraction vector Q under testing, $Q(\alpha_0,\beta_0)=Q(0,0)$, that is, the direction angle (or orientation angle) is $\alpha_0$ and $\beta_0$. Combined with the selection of $WK\alpha_1$ as the short-wavelength characteristic X-ray, the diffraction angle is determined to be $2\theta_{111}=5.12°$.

In step 3, the 2024 aluminum plate is disposed on the sample platform 3 of the diffraction apparatus in embodiment 1 and is adjusted to near the center of the diffractometer circle. A distance from the center of the diffractometer circle to a window of the W target X-ray tube 1 is 200 mm, and a distance from the center of the diffractometer circle to the array detector 5 is 200 mm. The incident collimator is made of tungsten alloy, and has rectangular light-passing holes, each of which has a divergence greater than 0.11° on the diffractometer circle plane of the diffraction apparatus and a width of 0.1 mm.

In step 4, the array detection system is arranged at the diffraction angle $2\theta=2\theta_{hkl}$ of the diffraction apparatus and in the direction of the diffraction vector Q ($\alpha_0$, $\beta_0$). Specifically, the $\theta$ rotation mechanism 13 located at 0° and the 2$\theta$ rotation mechanism 14 located at 0° are rotated 2.56° in opposite directions (the $\theta$ rotation mechanism 13 is rotated by 2.56° clockwise, and the 2$\theta$ rotation mechanism 14 is rotated by 2.56° counterclockwise). In this case, the diffraction angle of the array detection system is $2\theta_{111}=5.12°$. The direction angle $\alpha$ of the diffraction vector Q under testing is rotated to $\alpha=0°$, and by rotation of the $\beta$ rotation mechanism 15, the direction angle $\beta$ of the diffraction vector Q under testing is rotated to $\beta=0°$. In this way, the array detection system can measure count intensities of short-wavelength characteristic X-rays diffracted along a thickness direction of the sample under testing.

In steps 5 to 6, a CdTe array detector 5 with 128×256 detection pixels is used, and parameters of the array detector 5 are configured. The size of each detection pixel is 0.1 mm×0.1 mm, and each pixel of the array detector 5 has an energy resolution of 2W (better than 10%) and is provided with at least two pulse height comparators (the height of each pulse is proportional to the detected photon energy). The receiving array collimator 6 fixed in front of the array detector 5 has rectangular holes parallel to each other and of the same size (the rectangular hole is 0.1 mm wide and 5 mm high). The distance between the center lines of adjacent light-passing holes is 0.1 mm, and the divergence of each hole is the same and is 0.11° on the diffractometer circle plane. The receiving array collimator 6 is made of tungsten alloy, and each light-passing hole is aligned with a detection unit composed of 50 pixels. The $WK\alpha_1$ diffraction count intensity detected by the $i^{th}$ detection unit is the sum of the $WK\alpha_1$ diffraction count intensities detected by the corresponding 50 pixels, that is, the $WK\alpha_1$ diffraction count intensity $I_i$ detected by the $i^{th}$ detection unit.

The energy thresholds $E_1=0.95E_0$ and $E_2=1.05E_0$ ($WK\alpha_1$ photon energy $E0=59.3$ kev) of a photon detected by each pixel are determined by presetting the pulse height of the pulse height comparator. The $i^{th}$ detection unit of the array detector 5 detects and records both the number $I1_i$ of photons with energy greater than or equal to energy $E_1$ and the number $I2_i$ of photons with energy greater than or equal to energy $E_2$. The difference ($I1_i-I2_i$) of the number $I1_i$ of photons with energy greater than or equal to energy $E_1$ minus the number $I2_i$ of photons with energy greater than or equal to energy $E_2$ is the number of $WK\alpha_1$ photons with energy greater than or equal to energy E1 and less than or equal to energy E2 detected and recorded by the $i^{th}$ detection unit of the array detector 5. That is, $I1_i-I2_i$ is the $WK\alpha_1$ diffraction count intensity $I_i=I1_i-I2_i$ detected by the $i^{th}$ detection unit.

Testing parameters are set as follows: measurement duration=20 s, tube voltage=200 kv, tube current=12 mA, etc.

The test is started. The $WK\alpha_1$ count intensities diffracted by parts with layer spacing of 1.12 mm are measured simultaneously over the entire thickness of the 2024 aluminum plate. Test data are saved after taking 20 s to complete the test.

Figure 8:
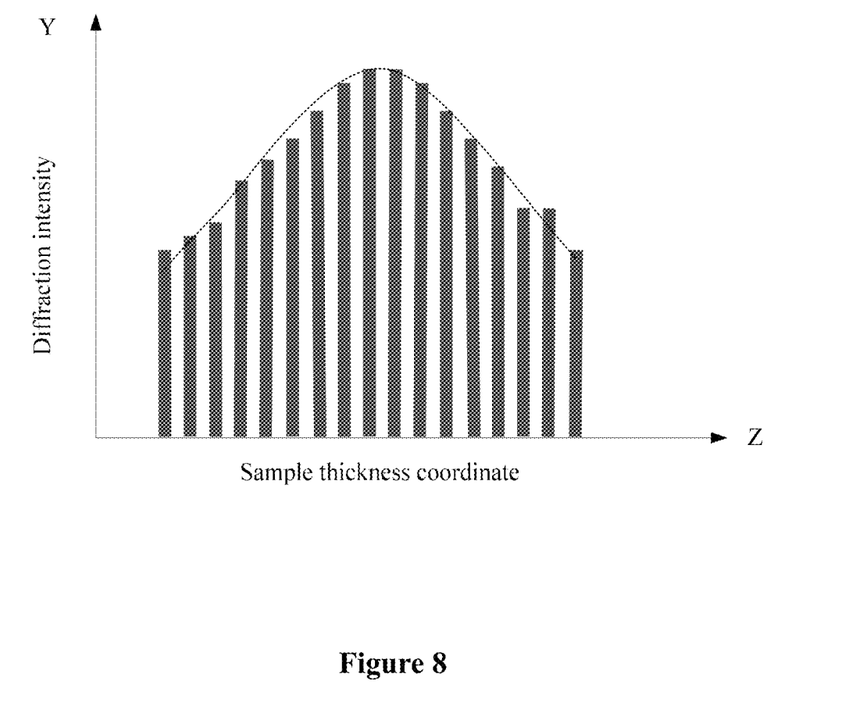
FIG. 8 is a characterization of a diffraction intensity distribution of a Al(111) crystal plane of a 25 mm thick pre-stretched aluminum plate along thickness in a direction of diffraction vector Q(0,0) according to embodiment 2 of the present disclosure.

Standard sample data of a 25 mm thick non-textured aluminum powder plate measured in advance under the same conditions are used to perform an X-ray absorption correction on the test data of the cold-rolled 25 mm thick 2024 aluminum plate measured above, so as to obtain the $WK\alpha_1$ count intensities diffracted by the parts with layer spacing of 1.12 mm on the thickness coordinate and a distribution thereof. The test result is shown in FIG. 8.

In step 7, internal crystal orientation uniformity within the sample under testing is determined according to a difference degree of a short-wavelength characteristic X-ray diffraction intensity distribution in a sample space. It can be seen from FIG. 8 that the difference between $WK\alpha_1$ count intensities diffracted by different parts of the 2024 aluminum plate is large (the difference between the column heights is apparent), and it can be determined that the internal crystal orientation of the cold-rolled 25 mm thick 2024 aluminum plate is not uniform.

Embodiment 3

A method for non-destructively testing internal crystal orientation uniformity of a workpiece is provided, to test the crystal orientation uniformity in a cold-rolled 20 mm thick 7075 aluminum plate.

The testing method, steps, and diffraction apparatus in this embodiment are the same as those in embodiment 1 and Embodiment 2, except for the selection of the following parameters.

The direction at the point 18 (the intersection point of the outer circle of the pole figure and a direction at an angle of 68° with the transverse TD direction) on the pole figure of FIG. 2 is selected as the direction of the diffraction vector Q under testing, that is, $Q(\alpha_1,\beta_1)=Q(0, 68°)$.

In this embodiment, the distance from the center of the diffractometer circle of the diffraction apparatus to the window of the W target X-ray tube 1 is 150 mm. The incident collimator is made of tungsten alloy, and has rectangular light-passing holes, each of which has a divergence greater than 0.15° on the diffractometer circle plane and a width of 0.08 mm.

During the operation, by rotation of the $\beta$ rotation mechanism, the direction angle $\beta$ of the diffraction vector Q under testing is rotated to $\beta=68°$.

In this embodiment, a CdZnTe array detector 5 with 64×64 detection pixels is used, and each pixel of the array detector is provided with a pulse height comparator (the height of each pulse is proportional to the detected photon energy). The receiving array collimator has rectangular light-passing holes each with a width of 0.2 mm and a height of 1 mm and a divergence of 0.15° on the diffractometer circle plane. Each light-passing hole is aligned with a detection unit composed of 2×10 pixels. The $WK\alpha_1$ diffraction count intensity detected by the $i^{th}$ detection unit is the sum of the $WK\alpha_1$ diffraction count intensities detected by the corresponding 20 pixels.

An energy threshold $E_1=0.95E_0$ of a photon detected by each pixel is determined by presetting the pulse height of the pulse height comparator. During the measurement, the number $I1_i$ of photons with energy greater than or equal to energy $E_1$ detected and recorded by the $i^{th}$ detection unit is determined as the $WK\alpha_1$ diffraction count intensity $I_i$ detected by the $i^{th}$ detection unit.

Testing parameters are set as follows: measurement duration=10 s, tube voltage=200 kv, tube current=8 mA, and the 7075 aluminum plate is in a uniform rectilinear motion at a speed of 10 mm/s in the direction perpendicular to paper of FIG. 3 showing a diagram of the apparatus, etc.

The test is started. The 7075 aluminum plate in a uniform rectilinear motion at the speed of 10 mm/s is tested continuously and non-destructively. $WK\alpha_1$ count intensities diffracted by parts with layer spacing of 0.9 mm and the distribution thereof are measured over the entire thickness of the 7075 aluminum plate with a length of 100 mm each 10 seconds, and test data are saved.

Figure 9:
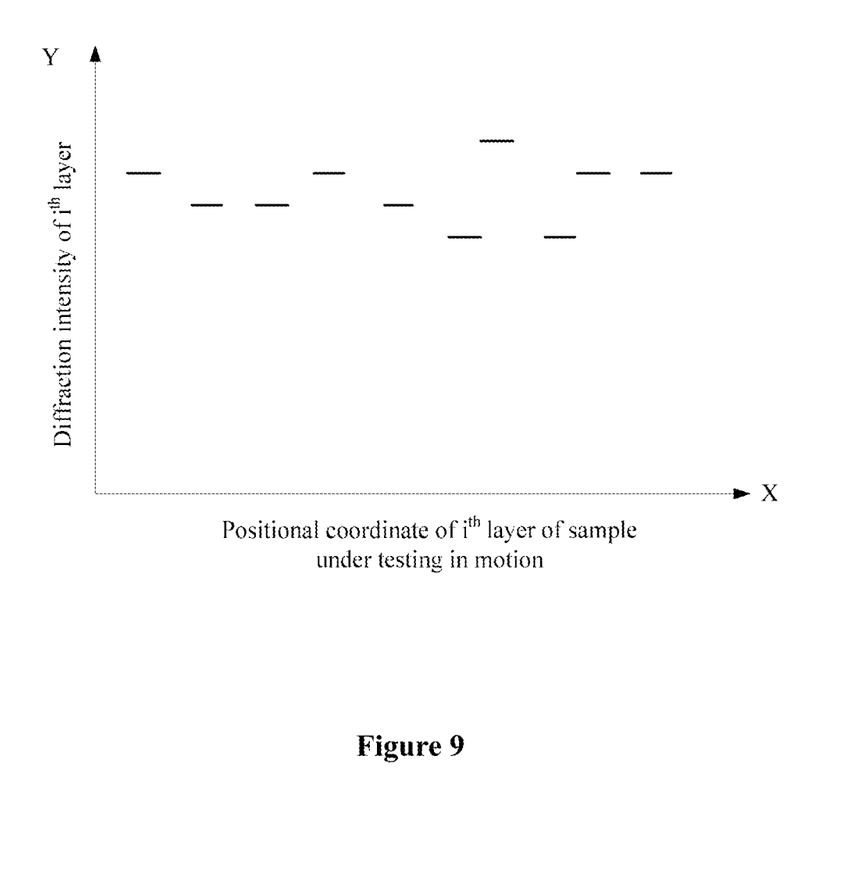
FIG. 9 is a characterization of a diffraction intensity distribution of an $i^{th}$ layer of a rolled aluminum plate in motion at positions of a sample according to embodiment 3 of the present disclosure.
Figure 10:
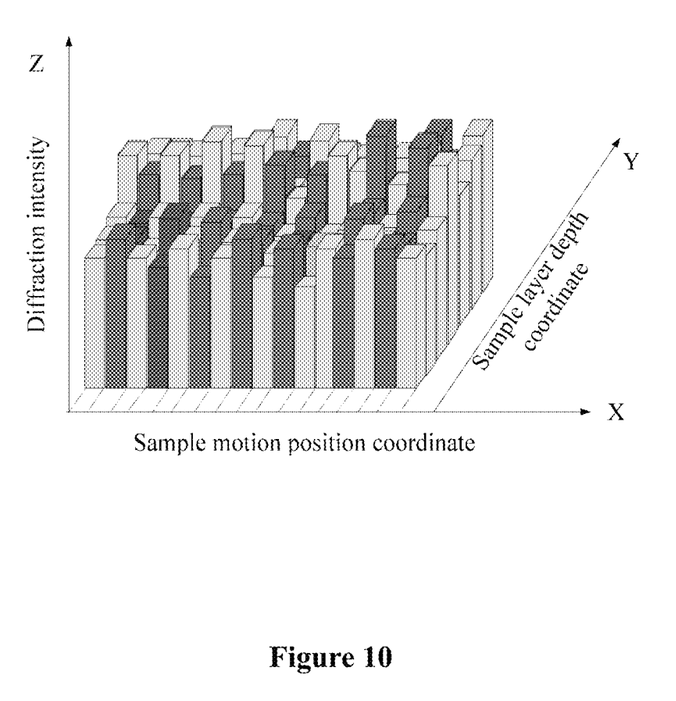
FIG. 10 is a characterization of a diffraction intensity distribution at positions of motion and sample depths of the rolled aluminum plate in motion according to embodiment 3 of the present disclosure.

Standard sample data of a 20 mm thick non-textured aluminum powder plate measured in advance under the same conditions are used to perform an X-ray absorption correction on the test data of the cold-rolled 20 mm thick 7075 aluminum plate measured above. The $WK\alpha_1$ count intensities diffracted by the parts with layer spacing of 0.9 mm over the entire thickness coordinate and the distribution thereof over the entire thickness are obtained each 10 seconds. The test result is intuitively represented as shown in FIG. 8. In this embodiment, the average of the $WK\alpha_1$ count intensities diffracted by the parts with spacing of 100 mm from each other over a length coordinate of the aluminum plate and the distribution thereof along the entire length of the aluminum plate are obtained for each layer, and the detection result thereof is intuitively represented as shown in FIG. 9. The obtained short-wavelength characteristic X-ray diffraction intensity distribution of areas scanned by an incident X-ray beam, that is, a surface distribution of short-wavelength characteristic X-ray diffraction intensities, may be intuitively represented as shown in FIG. 10, to determine the internal crystal orientation uniformity of the tested cold-rolled 20 mm thick 7075 aluminum plate.

Embodiment 4

A method for non-destructively testing internal crystal orientation uniformity of a workpiece is provided, to test the internal crystal orientation uniformity of a cold-rolled 25 mm thick 7050 aluminum plate.

The testing method, steps, and diffraction apparatus in this embodiment are the same as those in embodiment 1 and embodiment 2, except for the selection of the following parameters.

A direction at a point reached by rotating 2.56° in a radial direction from the point 17 (the intersection point of the outer circle of the pole figure and the transverse direction TD) on the pole figure of FIG. 2 is selected as the direction of the diffraction vector Q under testing, that is, $Q(\alpha_0,\beta_0)=Q(2.56°,0)$. Before starting the measurement, $\theta=0°$, $\beta=0°$, and the 2θ rotation mechanism rotates to 5.12° (i.e., $2\theta_{111}=5.12'$). The diffraction angle of the array detection system is $2\theta_{111}=5.12°$. That is, the incident X-ray beam is incident perpendicular to the aluminum plate, and coincides with the β rotation axis.

A CdTe array detector 5 with 64×64 detection pixels is used. The $WK\alpha_1$ diffraction count intensity detected by the $i^{th}$ detection unit is the sum of the $WK\alpha_1$ diffraction count intensities detected by the corresponding 50 pixels, i.e., the $WK\alpha_1$ diffraction count intensity $I_i$ detected by the $i^{th}$ detection unit. The result is shown in FIG. 8 to intuitively represent the uniformity of crystal orientation, for determining the uniformity of crystal orientation of the sample.

Embodiment 5

A method for non-destructively testing internal crystal orientation uniformity of a workpiece is provided, to test a single crystal cuboid sample of 6 mm thick nickel-based alloy GH4169. The method is required to non-destructively test the internal crystal orientation uniformity of the sample, to determine the monocrystallinity of the sample.

The test method, steps, and diffraction apparatus in this embodiment are the same as those in embodiment 1 and embodiment 2, except for the selection of the following parameters.

In this embodiment, XRD is used to detect and analyze the material and its crystal orientation in a part of an intermediate layer of the sample. The Ni (200) crystal plane of the sample is selected as the diffraction crystal plane, and its width direction as the direction of the diffraction vector under testing, that is, $Q(\alpha_0,\beta_0)=Q(0,0)$. Combined with the selection of $UK\alpha_1$ (wavelength $\lambda_0=0.0126$ nm and photon energy $E_0=98.2$ kev) as the short-wavelength characteristic X-ray, the diffraction angle is determined to be $2\theta_{200}=3.086°$.

The distance from the center of the diffractometer circle of the diffraction apparatus to the window of the W target X-ray tube 1 is 300 mm, and the distance from the center of the diffractometer circle of the apparatus to the array detector 5 is 150 mm. The width of the light-passing hole of the incident collimator is 0.06 mm.

The θ rotation mechanism 13 located at 0° and the 2θ rotation mechanism 14 located at 0° are rotated by 1.543° in opposite directions. The direction angle α of the diffraction vector Q under testing is rotated to α=0°. In this case, the diffraction angle of the array detection system is $2\theta_{200}=3.086°$. By rotation of the β rotation mechanism 15, the direction angle β of the diffraction vector Q is rotated to β=0°.

Testing parameters are set as follows: measurement duration=120 s, tube voltage=270 kv, tube current=5 mA, etc.

The test is started. The $WK\alpha_1$ count intensities diffracted by parts with layer spacing of 1.1 mm are measured simultaneously over the entire thickness. Test data are saved after taking 120 s to complete the test. The $UK\alpha_1$ count intensities diffracted by the parts with layer spacing of 1.1 mm on the thickness coordinate and its distribution along the entire thickness of the plate are obtained. The result is shown in FIG. 8 to intuitively represent the uniformity of crystal orientation, to determine the monocrystallinity of the sample.

The invention claimed is:
1. A diffraction apparatus, comprising:
an X-ray irradiation system for irradiating an X-ray to a measured part of a sample under testing, and
an X-ray detection system for simultaneously detecting a plurality of diffracted X-rays formed by diffraction of a plurality of parts of the sample under testing, to measure an X-ray diffraction intensity distribution of the sample under testing,
wherein the detected diffracted X-rays are short-wavelength characteristic X-rays, and the X-ray detection system is an array detection system,
wherein the array detection system comprises a receiving array collimator (6), and an array detector (5) that matches the receiving array collimator (6) and has detection units each enabled with single-photon measurement, wherein the X-ray irradiation system comprises:

a heavy metal anode target X-ray tube (1), an incident collimator (2), a sample platform (3) on which the sample under testing (4) is disposed, a main control computer (7), a high voltage generator (8), a controller (9), a remote operation terminal (10), an X-ray shielding cover (12), a θ rotation mechanism (13) that drives the heavy metal anode target X-ray tube (1) to rotate, a 2θ rotation mechanism (14) that drives the array detection system to rotate, a β rotation mechanism (15) that drives the array detection system to rotate, and a frame (16), wherein the heavy metal anode target X-ray tube (1), the incident collimator (2), and the array detection system are mounted on the frame (16);

short-wavelength characteristic X-rays diffracted by different parts of the sample are directly incident on corresponding detection units of the array detector (5) through corresponding light-passing holes of the receiving array collimator (6);

the heavy metal anode target X-ray tube (1) and the incident collimator (2) are mounted on the θ rotation mechanism (13), the θ rotation mechanism (13) is configured to drive the heavy metal anode target X-ray tube (1) and the incident collimator (2) to rotate around the center (21) of the diffractometer circle, the array detection system is mounted on the 2θ rotation mechanism (14), the 2θ rotation mechanism (14) is configured to drive the array detection system to rotate around the center (21) of the diffractometer circle, the array detection system is also mounted on the β rotation mechanism (15) by the 2θ rotation mechanism (14), the β rotation mechanism (15) is configured to drive the array detection system to rotate around a vertical imaginary line passing the center of the diffractometer circle of the diffraction apparatus as an axis, θ=0° in a case that the heavy metal anode target X-ray tube (1) and the incident collimator (2) so rotate as to cause an incident beam to coincide with a β rotation axis, and 2θ=0° in a case that the array detection system so rotates as to cause orientations of light-passing holes of the receiving array collimator (6) to coincide with or be parallel to the β rotation axis.

2. The diffraction apparatus according to claim 1, wherein a size of each pixel of the array detector (5) is 0.05 mm to 0.2 mm.

3. The diffraction apparatus according to claim 2, wherein the array detector (5) is a CdTe array detector or a CdZnTe array detector.

4. The diffraction apparatus according to claim 2, wherein a size of each of light-passing holes of the receiving array collimator (6) is 0.05 mm to 0.2 mm, a distance between centers of adjacent light-passing holes is 0.02 mm to 0.2 mm, and the light-passing holes are parallel to each other and with the same size.

5. The diffraction apparatus according to claim 4, wherein a divergence of each of light-passing holes of the receiving array collimator (6) on a diffractometer circle plane of the diffraction apparatus is 0.02° to 0.2°.

6. The diffraction apparatus according to claim 5, wherein the X-ray irradiation system comprises an incident collimator (2), and both the incident collimator (2) and the receiving array collimator (6) are made of a heavy metal material with an atomic number greater than 46.

7. The diffraction apparatus according to claim 6, wherein the incident collimator (2) and the receiving array collimator (6) are made of gold, silver or tungsten.

8. The diffraction apparatus according to claim 2, wherein each pixel of the array detector (5) is provided with a pulse height comparator.

9. The diffraction apparatus according to claim 2, wherein each pixel of the array detector (5) is provided with at least two pulse height comparators.

10. The diffraction apparatus according to claim 1, wherein a distance from the center (21) of a diffractometer circle of the diffraction apparatus to a window of the heavy metal anode target X-ray tube (1) is 75 mm to 300 mm, and a distance from the center (21) of the diffractometer circle to the array detector (5) of the array detection system is 100 mm to 300 mm;

an extended center line of a light-passing hole of the incident collimator (2) and an extended center line of a detection unit in a middle section of the array detector (5) intersect at the center (21) of the diffractometer circle;

the heavy metal anode target X-ray tube (1), the high voltage generator (8) and the controller (9) form an X-ray source to emit X-rays, the heavy metal anode target X-ray tube (1) comprises a W target X-ray tube, an Au target X-ray tube, an Ag target X-ray tube, or a U target X-ray tube, and a voltage applied to the heavy metal anode target X-ray tube (1) is not less than twice an excitation voltage for generating a short-wavelength characteristic X-ray;

a short-wavelength characteristic X-ray diffraction count intensity measured by each corresponding detection unit of the array detector (5) enters a communication interface of the main control computer (7) via a signal cable; and the controller (9) is configured to start the high voltage generator (8), and adjust and control a voltage and a current outputted by the high voltage generator (8), the main control computer (7) and the remote operation terminal (10) on both sides of the X-ray shielding cover (12) are connected by a signal cable, and the diffraction apparatus is operable and controllable by an operator with the main control computer (7) on the remote operation terminal (10).

11. The diffraction apparatus according to claim 10, wherein a size of the light-passing hole of the incident collimator (2) is 0.05 mm to 0.2 mm, and a divergence of the light-passing hole of the incident collimator (2) on the diffractometer circle plane is 0.02° to 0.2°.

12. A method for non-destructively testing internal crystal orientation uniformity of a workpiece, with the diffraction apparatus according to claim 1, the method comprising:

step 1: selecting a short-wavelength characteristic X-ray, and determining a wavelength $\lambda_0$ and a photon energy $E_0$;

step 2: performing a texture analysis on a matrix phase of a part of a sample under testing, selecting a strong diffraction crystal plane (hkl) of the matrix phase of the sample under testing as a diffraction crystal plane under testing, determining a corresponding diffraction angle $2\theta_{hkl}$, selecting a direction with a maximum of the diffraction intensity distribution of the diffraction crystal plane or a direction near the direction as a direction of a diffraction vector Q under testing, and determining azimuth angles $\alpha_0$ and $\beta_0$ of the direction of the diffraction vector Q under testing in a coordinate system of the sample under testing;

step 3: disposing a thickness center of the sample under testing near the center of a diffractometer circle of the diffraction apparatus;

step 4: arranging the array detection system at the diffraction angle $2\theta_{hkl}$ of the diffraction apparatus and in the direction of the diffraction vector Q ($\alpha_0$, $\beta_0$), whereby the array detection system simultaneously measures count intensities of short-wavelength characteristic X-rays diffracted by parts along a layer depth of the sample under testing, wherein the parts along the layer depth of the sample refer to corresponding parts where incident X-ray beams passing through the sample under testing along a path intersect with spatial extended lines of light-passing holes of a receiving array collimator;

step 5: starting a test, measuring simultaneously count intensities of short-wavelength characteristic X-rays diffracted in the direction of $2\theta_{hkl}$ by the parts along a path in which incident X-ray beams pass through the sample under testing, in the direction of the diffraction vector Q ($\alpha_0$, $\beta_0$), in a case that the sample under testing is fixed relative to the diffraction apparatus, and measuring continuously, at a fixed time interval, count intensities of short-wavelength characteristic X-rays diffracted by corresponding parts in areas of the sample under testing scanned by an incident X-ray beam and a distribution of the count intensities, in a case that the sample under testing is moving relative to the diffraction apparatus;

step 6: correcting the count intensities of the short-wavelength characteristic X-rays obtained by the array detection system, and obtaining short-wavelength characteristic X-ray diffraction intensities of coordinate positions in measured parts of the sample under testing and a distribution of the short-wavelength characteristic X-ray diffraction intensities; and step 7: determining internal crystal orientation uniformity within the sample under testing according to a difference degree of the distribution of the short-wavelength characteristic X-ray diffraction intensities in a sample space.

13. The method according to claim 12, wherein the array detection system comprises the receiving array collimator and an array detector, and each pixel of the array detector is enabled with single photon measurement;

the array detector is a one-dimensional array detector, and a detection unit of the array detector is a pixel corresponding to a light-passing hole of the receiving array collimator, wherein an X-ray count intensity detected by an $i^{th}$ detection unit is a short-wavelength characteristic X-ray count intensity $I_i$ detected by an $i^{th}$ pixel corresponding to a respective light-passing hole; or, the array detector is a two-dimensional array detector, and an $i^{th}$ detection unit of the array detector is formed by a column of pixels corresponding to a light-passing hole of the receiving array collimator, wherein the short-wavelength characteristic X-ray count intensity detected by the $i^{th}$ detection unit is a sum of X-ray count intensities detected by the column of pixels corresponding to the light-passing hole.

14. The diffraction apparatus according to claim 3, wherein a divergence of each of light-passing holes of the receiving array collimator (6) on a diffractometer circle plane of the diffraction apparatus is 0.02° to 0.2°.

15. The method according to claim 12, wherein the array detection system comprises the receiving array collimator and an array detector, each pixel of the array detector has an energy resolution of 2W and is provided with a pulse height comparator, an energy threshold $E_1=(1-W)E_0$ of a photon detected by each pixel is determined by presetting a pulse height of the pulse height comparator, whereby an $i^{th}$ detection unit of the array detector only detects and records the number of photons with energy greater than or equal to the energy $E_1$, and the number of the photons with energy greater than or equal to the energy $E_1$ detected and recorded by the $i^{th}$ detection unit of the array detector is a short-wavelength characteristic X-ray count intensity $I_i$ detected by the $i^{th}$ detection unit of the array detector.

16. The method according to claim 12, wherein the array detection system comprises the receiving array collimator and an array detector, each pixel of the array detector has an energy resolution of 2W and is provided with at least two pulse height comparators, energy thresholds $E_1=(1-W)E_0$ and $E_2=(1+W)E_0$ of photons detected by each pixel are determined by presetting a pulse height, whereby an $i^{th}$ detection unit of the array detector detects and records both the number $I1_i$ of photons with energy greater than or equal to the energy $E_1$ and the number $I2_i$ of photons with energy greater than or equal to the energy $E_2$, and a difference of the number $I1_i$ of the photons with energy greater than or equal to the energy $E_1$ minus the number $I2_i$ of the photons with energy greater than or equal to the energy $E_2$ is a short-wavelength characteristic X-ray count intensity $I_i$ detected by the $i^{th}$ detection unit of the array detector.

17. The diffraction apparatus according to claim 2, wherein a divergence of each of light-passing holes of the receiving array collimator (6) on a diffractometer circle plane of the diffraction apparatus is 0.02° to 0.2°.

18. The diffraction apparatus according to claim 3, wherein a size of each of light-passing holes of the receiving array collimator (6) is 0.05 mm to 0.2 mm, a distance between centers of adjacent light-passing holes is 0.02 mm to 0.2 mm, and the light-passing holes are parallel to each other and with the same size.

* * * * *